(No Model.) 7 Sheets—Sheet 2.
W. C. CRANDELL, Jr.
RAILWAY SIGNALING.
No. 342,499. Patented May 25, 1886.
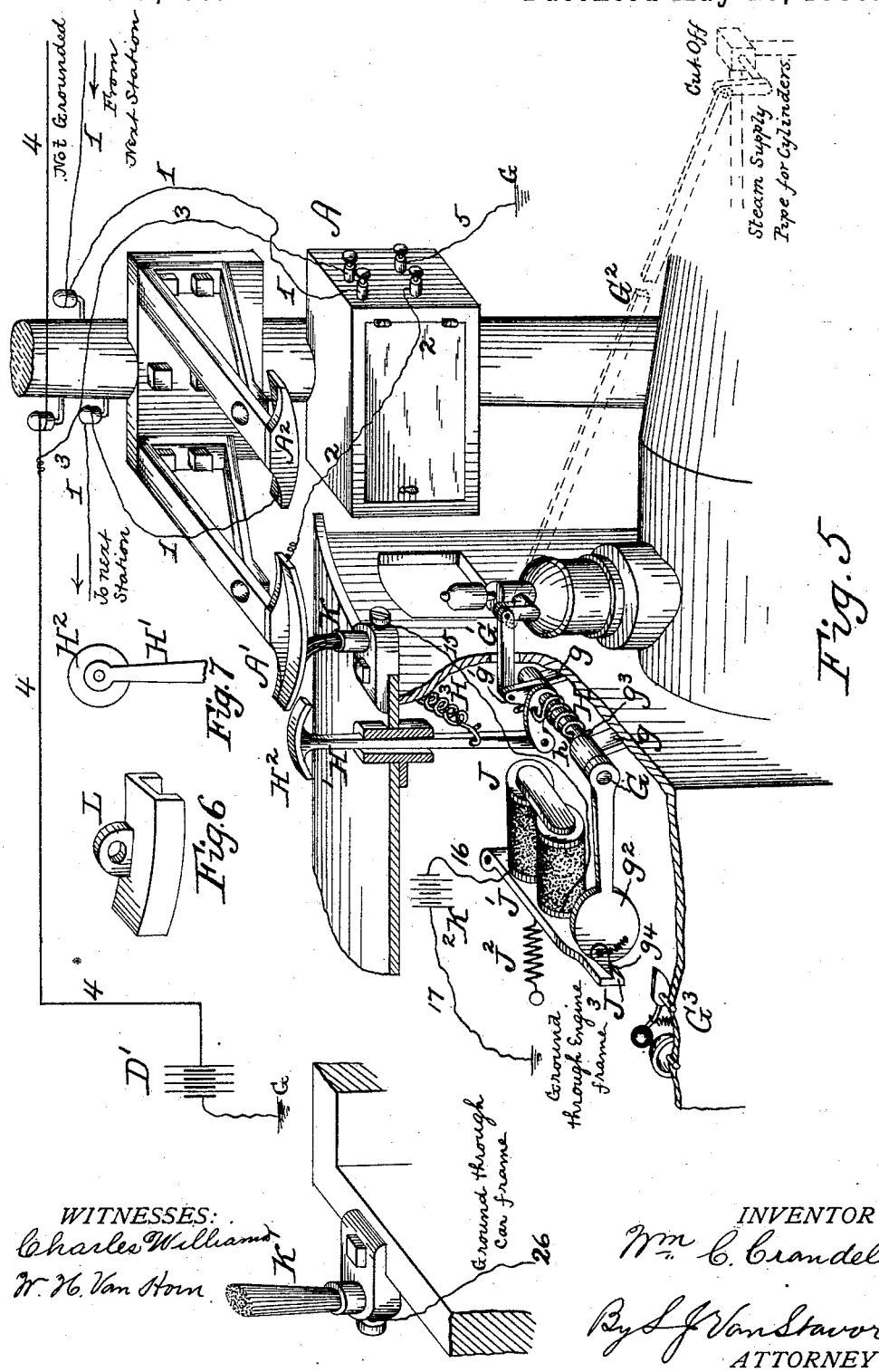

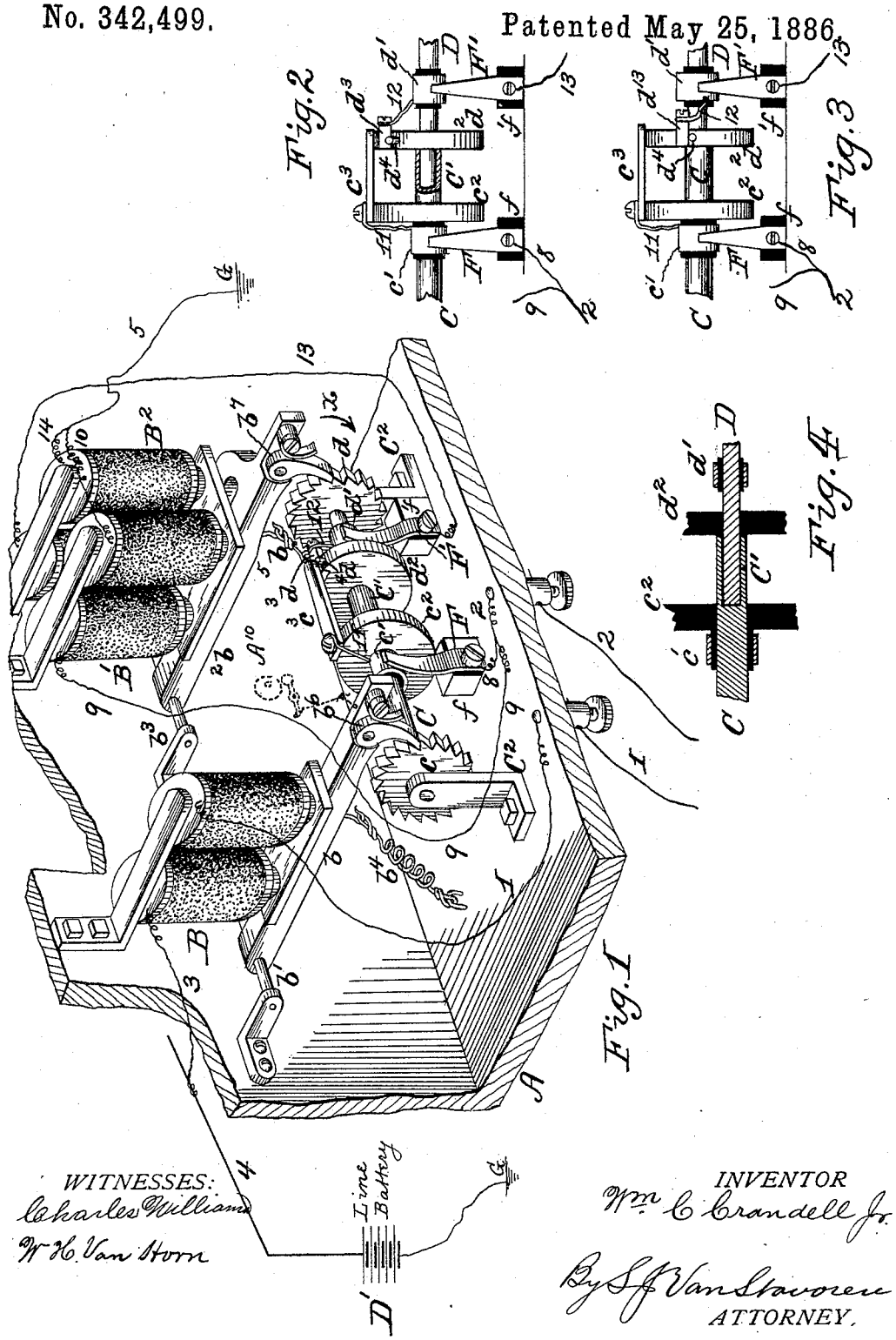

(No Model.) 7 Sheets—Sheet 3.
W. C. CRANDELL, Jr.
RAILWAY SIGNALING.
No. 342,499. Patented May 25, 1886.
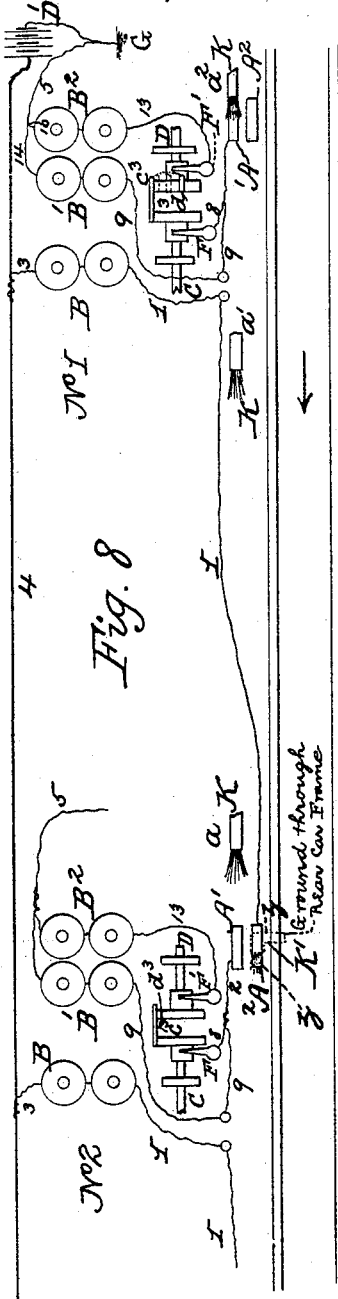
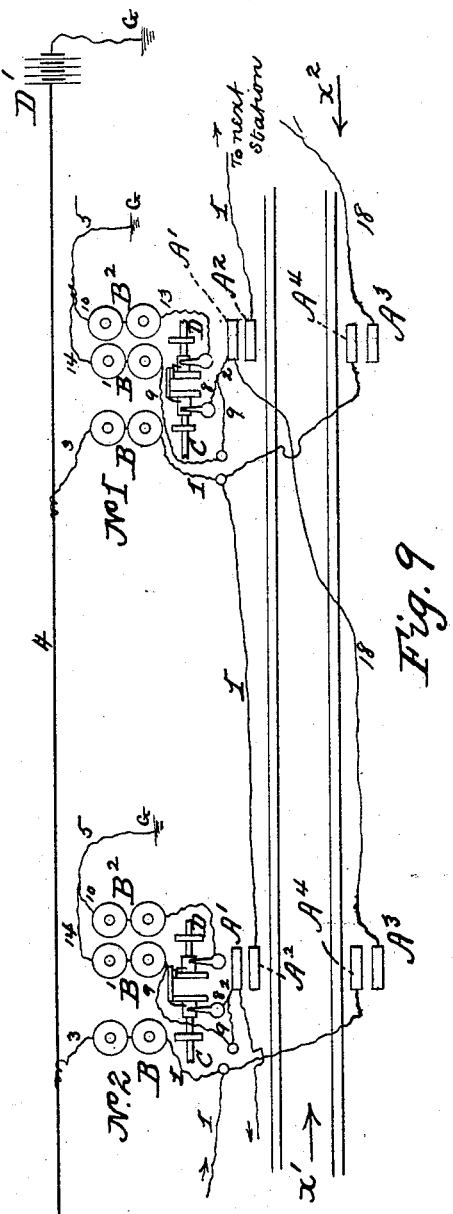
WITNESSES:
Charles Williams
W. H. Van Horn
INVENTOR,
Wm. C. Crandell Jr
By S. J. Van Stavoren
ATTORNEY.

(No Model.) 7 Sheets—Sheet 4.

W. C. CRANDELL, Jr.
RAILWAY SIGNALING.

No. 342,499. Patented May 25, 1886.

WITNESSES:
Charles Williams
W. H. Van Horn

INVENTOR,
Wm C. Crandell Jr.
By S. J. Van Stavoren
ATTORNEY (No Model.)  7 Sheets—Sheet 5.

W. C. CRANDELL, Jr.
RAILWAY SIGNALING.

No. 342,499.  Patented May 25, 1886.

WITNESSES:
Charles Williams
W. H. Van Horn

INVENTOR
Wm. C. Crandell Jr.
By S. J. Van Staworen
ATTORNEY (No Model.) 7 Sheets—Sheet 6.
W. C. CRANDELL, Jr.
RAILWAY SIGNALING.
No. 342,499. Patented May 25, 1886.
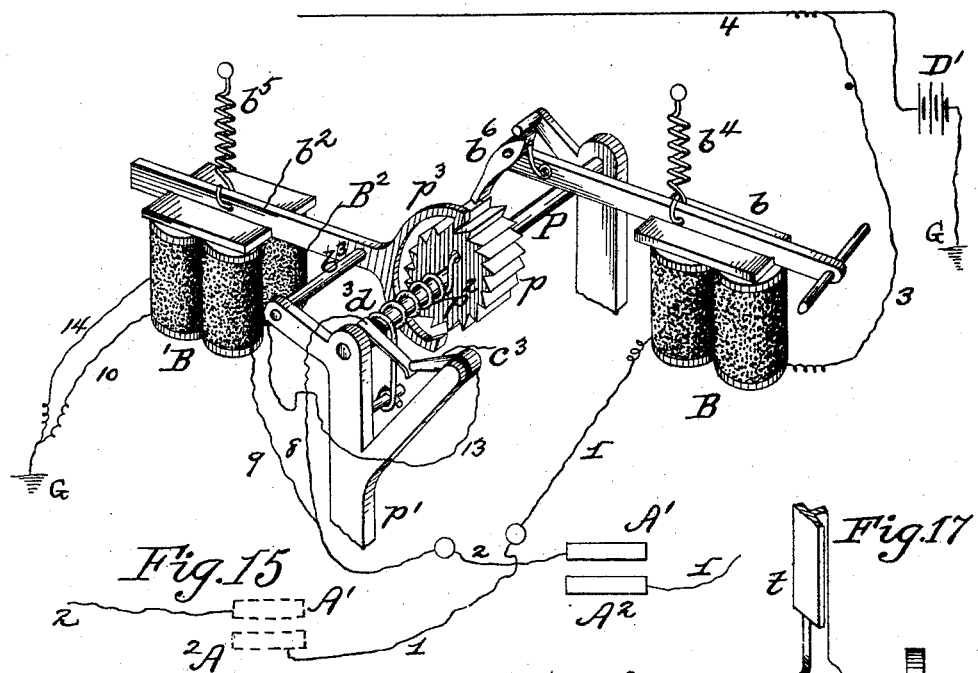
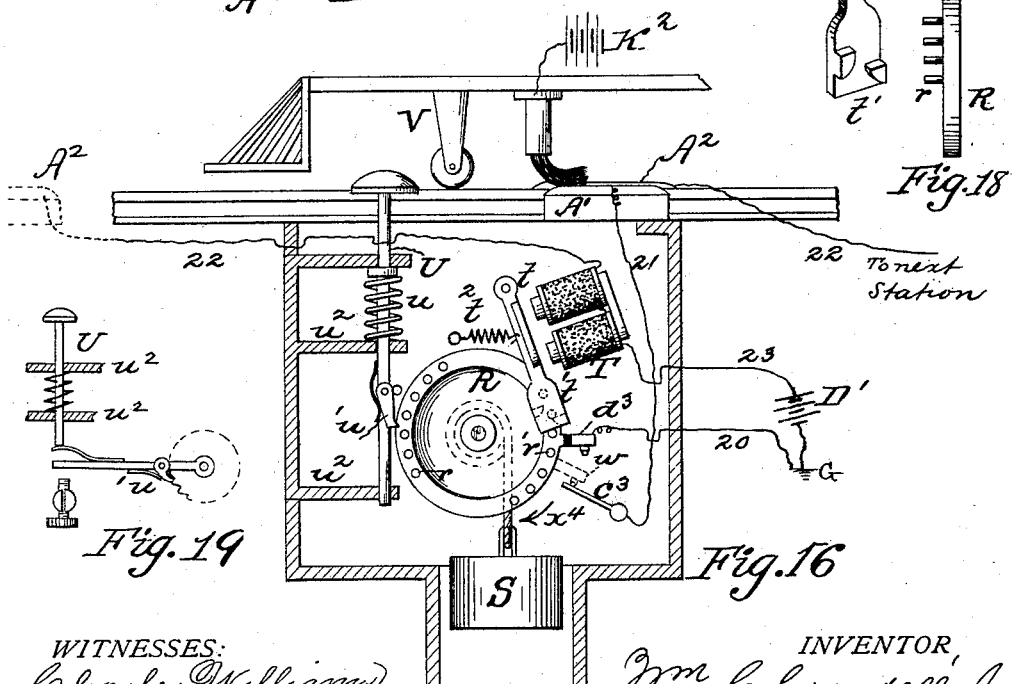
WITNESSES:
Charles Williams
W. H. Van Horn
INVENTOR,
Wm. C. Crandell Jr.
By S. J. Van Stavoren
ATTORNEY

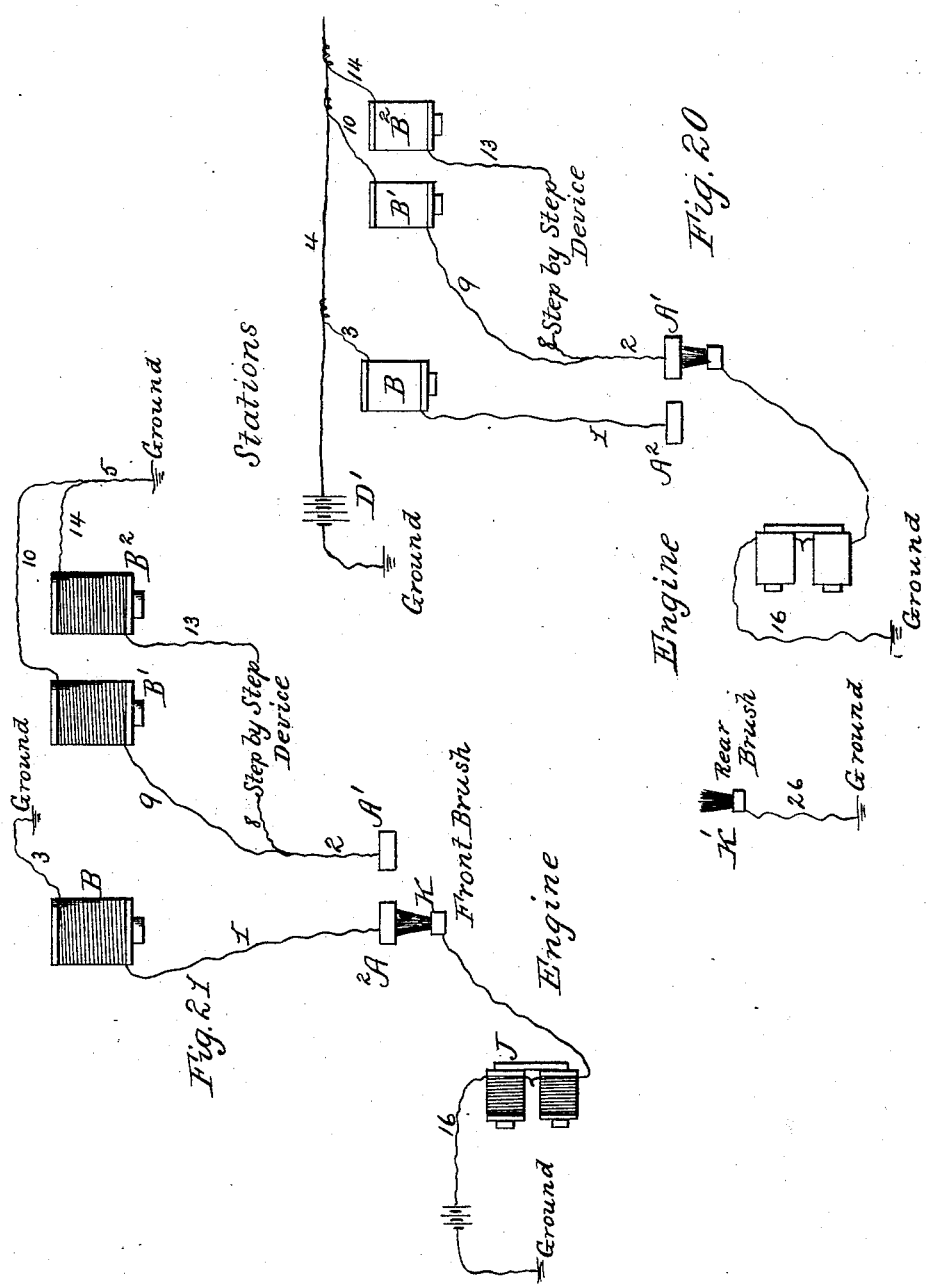

UNITED STATES PATENT OFFICE.

WILLIAM C. CRANDELL, JR., OF PHILADELPHIA, PENNSYLVANIA, ASSIGNOR OF ONE-HALF TO SAMUEL D. STROHM, OF SAME PLACE.

RAILWAY-SIGNALING.

SPECIFICATION forming part of Letters Patent No. 342,499, dated May 25, 1886.

Application filed April 19, 1883. Serial No. 92,229. (No model.)

*To all whom it may concern:*

Be it known that I, WILLIAM C. CRANDELL, Jr., a citizen of the United States, residing at Philadelphia, in the county of Philadelphia and State of Pennsylvania, have invented certain new and useful Improvements in Apparatus for Automatically Controlling the Movements of Railway-Trains, of which the following is a specification, reference being had therein to the accompanying drawings, wherein—

Figure 10:
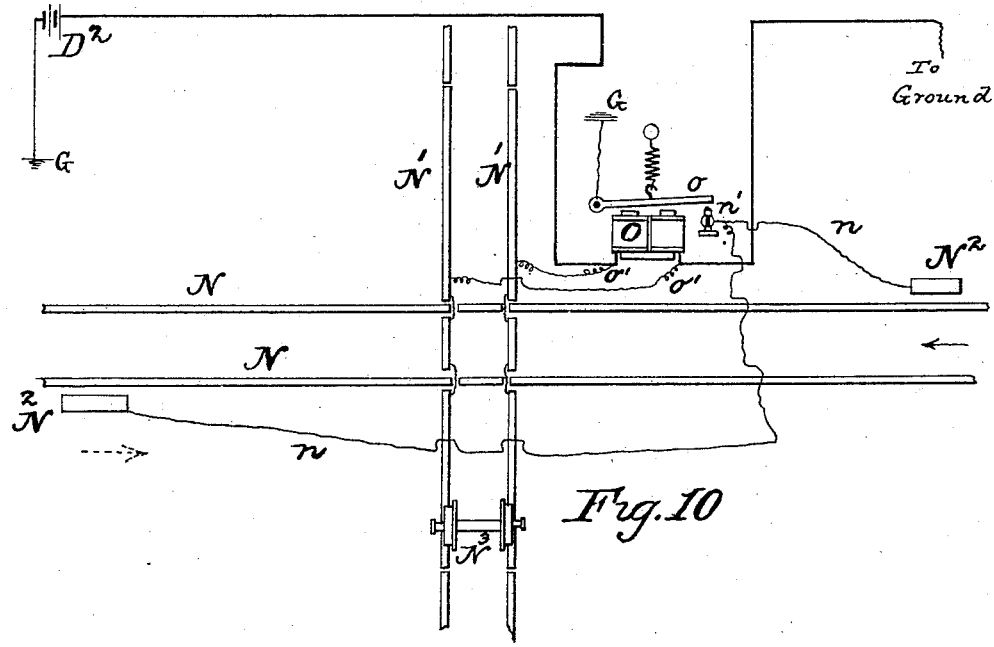
Figure 11:
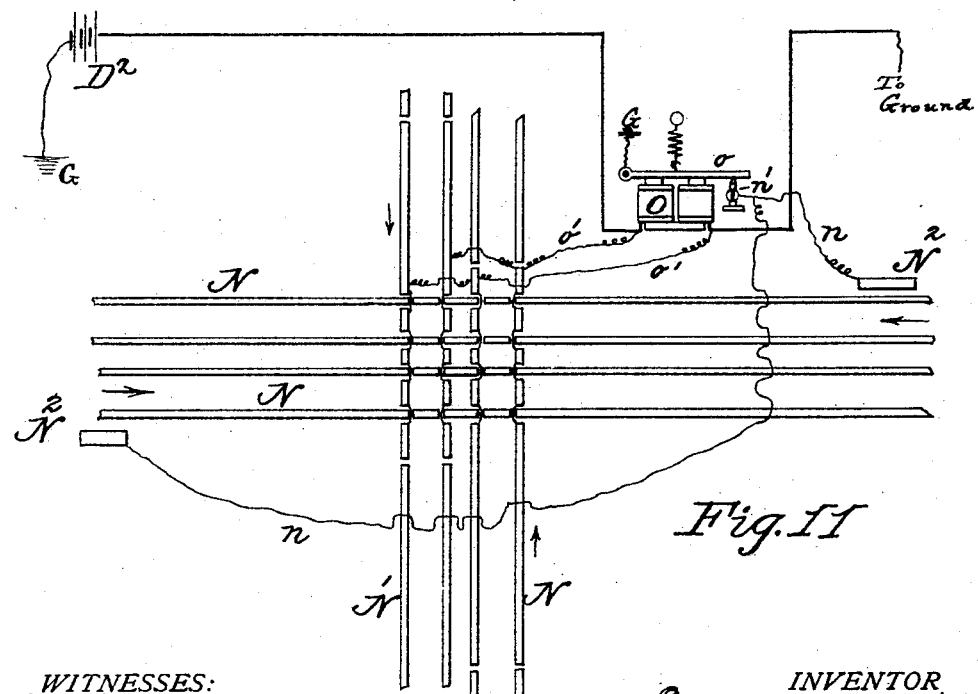
Figures 12, 14:
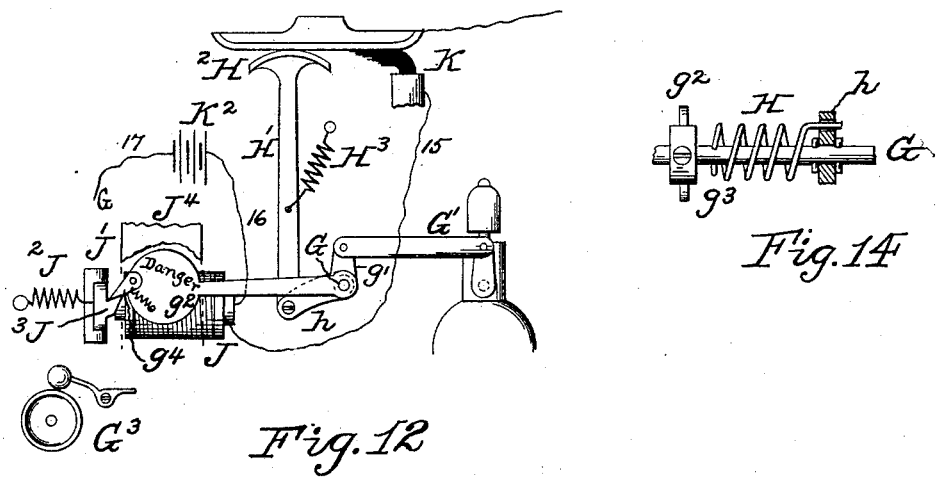
Figure 13:
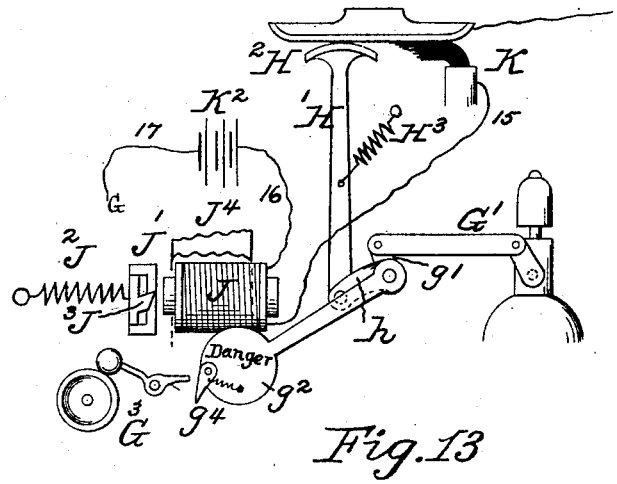

Figure 1 is a perspective illustrating the station electro-magnetic appliances. Figs. 2 and 3 are broken detail elevations of same.
Fig. 4 is a broken detail section. Fig. 5 is a perspective of magneto-electrical appliances for the train and station, illustrating my invention. Fig. 6 is a detail perspective. Fig. 7 is an elevation of a detail modification. Fig. 8 is a diagram illustrating my invention applied to a double-track railway, one track only being shown. Fig. 9 is a like view of same applied to a single-track railway. Fig. 10 is a diagram illustrating my improvements as applied to crossings of single-track railways. Fig. 11 is a like view for double-track crossings. Figs. 12 and 13 are broken elevations of engine or train appliances. Fig. 14 is a detail sectional elevation of same. Fig. 15 is a perspective of a modification of station appurtenances. Fig. 16 is a sectional elevation of a further modification of said appurtenances. Fig. 17 is a detail perspective of same. Fig. 18 is a detail elevation. Fig. 19 is an elevation of a detail modification; and Figs. 20 and 21 are diagrams illustrating still further modifications.

My invention has relation to avoiding collisions of railway-trains, and preventing them entering upon an open draw-bridge or switch by automatically controlling their movements by means of electro-magnetic appurtenances located at stations along the line of way, which are operated by appliances upon passing trains, whereby said appurtenances are locked in position, to cause the stoppage of following trains arriving at each such station before the leaders have passed off of the sections or blocks controlled by said station appurtenances.

In systems for automatically controlling the movements of railway-trains as at present devised, when a leading train arrives at a station and enters upon the clear block or section controlled by said station appurtenances, the latter are by said train locked in position to stop a following train, should it arrive at the station before said leader passes off of said block and while said following train is stopped, yet it does not lock said station appurtenances for the next or second following train, for the reason that the leader must pass off of said block and unlock said appurtenances before they can be locked by a following train arriving at the station. Consequently, when the leader passes off of the block and restores or unlocks the station appurtenances to denote a clear block or section ahead, there is yet upon and traveling over said block said following train; hence the second following train, when it arrives at such station, is not stopped, but travels on and enters said block, and if traveling faster than the train ahead, there is danger of collision.

My invention has for its object to avoid the above-described result by causing each passing train to lock the station appurtenances, no matter whether the trains are stopped at the stations or not, or whether said appurtenances have been previously locked by a leading train or trains, or whether there be one or more trains upon the blocks or sections controlled by the appurtenances. In all cases the latter will be locked by each passing train.

My invention has for its further object to prevent the unlocking of the station appurtenances until all the trains have passed off of the controlled block or section, to provide improved station appurtenances and engine appliances.

My invention accordingly consists of the novel combination, construction, and arrangement of parts, as hereinafter more specifically described and claimed, having reference particularly to the provision of step-by-step appurtenances located at the termini of each block or section, or at predetermined stations along the line of a railway, designed and adapted to be operated by appliances upon a passing train in such manner that said appurtenances and appliances conjointly operate to automatically control the movements of the train.

In the drawings, Figs. 1 to 4, A represents a box or case designed to be secured to a post or pole, as shown in Fig. 5, which is located adjacent to the tracks, or said box may be otherwise suitably disposed, as desired or convenience dictates. Any number of these boxes may be used and arranged as desired along the line of way, or their number may be governed by the number of the blocks or sections into which the railway is divided when trains are run thereon by what is known as the "block system," in which case the boxes are placed at the termini of each block; or, if desired, they may be located at successive or alternate passenger-stations or otherwise disposed, as the condition of the road and the danger of travel on its different parts may suggest or dictate. Within each box are placed magnets B, B', and $B^2$. The magnets B' and $B^2$ are constructed to have or offer different resistances to the passage of an electric current, the resistance of the former being higher than that of the latter. Consequently the magnets B' are high-resistance magnets, and the magnets $B^2$ low-resistance magnets.

The magnets B are provided with an armature, $b$, supported upon an arbor, $b'$, and the magnets B' $B^2$ have a common armature, $b^2$, supported on arbor $b^3$. Said armatures $b$ $b^2$ are respectively provided with retracting-springs $b^4$ $b^5$ and spring-pawls $b^6$ $b^7$.

C and D represent two aligning shafts, which have a bearing upon each other, as shown at C', Figs. 2 and 4, and also in brackets or supports $C^2$ $C^2$, so that said shafts may be moved independently of one another. The shaft C carries a ratchet-wheel, $c$, which engages with the pawl $b^6$ of armature $b$, an insulated collar, $c'$, and a disk, $c^2$, of non-conducting material carrying a conducting-finger, $c^3$, which is in electrical communication with collar $c'$ by means of a wire or connection, 11. The shaft D carries a ratchet-wheel, $d$, which is engaged by the pawl $b^7$ of armature $b^2$, an insulated collar, $d'$, and a disk, $d^2$, of non-conducting material carrying a pin or stop, $d^4$, and a conducting-plate, $d^3$, in electrical communication with collar $d'$ by means of wire or conductor 12, said pin $d^4$ being adjacent to and projecting above the plate $d^3$ to form a stop for preventing the finger $c^3$ being moved beyond or off of said plate, which is designed to be stepped away from the finger, and the latter correspondingly moved toward the plate, as and for the purposes hereinafter set forth.

The ratchet-wheels $c$ and $d$ are made of an equal size and have like number of teeth, and the pawls and armatures are so arranged in relation thereto that the extent of their motion is uniform, so that when the ratchet-wheels $c$ and $d$ are stepped by said pawls they will be moved to an equal extent.

The collars $c'$ and $d'$ are respectively provided with metal brushes or contacting-plates F F', secured to but insulated from the blocks $f$ $f'$.

A' $A^2$ represent contact-plates at the stations, located on the poles whereon are placed the boxes A, as indicated in Fig. 5; or they may be laid upon insulated blocks at the side of the track, as represented in Figs. 8 and 9. Said plates may be straight or curved, as shown in Fig. 5, or grooved, as indicated in Fig. 6. A wire or connector, 2, leads from plate A' to the box A of each station, and 1 is another wire, leading from the box A of one station to the plate $A^2$ of a succeeding or other station, as plainly shown in Figs. 8 and 9, thereby placing the boxes A and plates A' of each station, and the plates $A^2$ and boxes A of successive stations, in electrical connection with each other, respectively. The wire or conductor from plate $A^2$ passes to magnets B, which have a wire, 3, leading to line-wire 4, in circuit with a main or local battery or generator (represented at D') which has a ground at one end only, as illustrated. Its other end is designed to be successively grounded through the contact-plates $A^2$ by a passing train. The wire 2 from plate A' splits or has two wires, 8 and 9, connected therewith. The wire 9 is in circuit with the high-resistance magnets B', from which leads a ground, 10. The wire 8 is in circuit with the low-resistance magnets $B^2$, by way of brush F, collar $c'$, connection 11, finger $c^3$, plate $d^3$, conductor 12, collar $d'$, brush F, and wire 13, and from magnets $B^2$ proceeds a ground, 14. If desired, the grounds 10 and 14 may be united to form a common ground, 5, as shown.

The magnets B' and $B^2$ are operated or energized by a battery-circuit upon a passing train by means of a brush contacting with the plate A'. When either of said magnets is energized, the armature $b^2$ is vibrated and the plate $d^3$ is thereby stepped away from the finger $c^3$ to break contact therebetween, or disconnect the partial circuit of magnets $B^2$ and lock the box A. On the other hand, when the magnet B is energized its armature $b'$ is vibrated to step the finger $c^3$ into contact with plate $d^3$ to restore the circuit of magnets $B^2$ and unlock box A.

The engine appliances are more plainly shown in Figs. 5 and 12 to 14, wherein G represents a shaft supported in bearings $g$ $g$, secured to the cab of the engine. Said shaft is provided with a crank, $g'$, which connects with the cut-off for the steam-whistle and for the engine-cylinders by means of links G' and $G^2$, the latter being represented by dotted lines. If desired, a similar link may connect the crank $g'$ with the operating-valve for the air-brakes.

The shaft G carries a visual danger signal, $g^2$, which is normally concealed by a screen, (represented at $J^4$, Figs. 12 and 13.)

$h$ is an arm loosely mounted upon shaft G, and is held in place thereon by collars or pins on each side thereof, as shown in Fig. 14.

H is a spiral spring surrounding shaft G, one end of which is secured to arm $h$ and the other to said shaft, as indicated at $g^3$, so as to provide a tension between said arm and shaft in order that they may either move together or the former move independently of the latter, as hereinafter described. To said arm $h$ is secured a bar, H′, which, if desired, may pass upwardly and project above the roof of the cab, as shown in Fig. 5, so as to contact with the plates A′ when placed in an elevated position, or if the latter are located upon the ground, then said bar H′ passes downwardly thereto; or it may be otherwise suitably disposed. It has a bearing-plate, $H^2$; or a friction-roller may be substituted therefor, as shown in Fig. 7. $H^3$ represents a retracting-spring for bar H′.

J indicates a pair of magnets secured in position in any suitable manner, and are of the same resistance as that of station-magnets $B^2$, so that when both said magnets are in the same circuit they will both be energized by a current fed thereto. The magnets J have an armature, J′, with retracting-spring $J^2$. Said armature is provided with a catch or lip, $J^3$, which is designed to engage with a latch head, $g^4$, on signal $g^2$ when said armature is attracted by magnets J.

K represents the engine-brush for contact-plates A′, and it is located adjacent to and in line with the bar H′, so that when brush K contacts with plates A′, the plate or roller $H^2$ of bar H′ also impinges with and passes over plates A′ to move bar H′. If, when the latter is so moved, the armature J′ be then attracted, the signal $g^2$ is in its locked position. Consequently the shaft G is not rotated by said bar, but it merely oscillates the arm $h$ upon said shaft and the cut-off mechanism is not then operated to stop the train. If, however, said signal is not in a locked position or the armature J′ is unattracted, then said shaft G is rotated by said bar and the levers or links G′ $G^2$ are moved to sound the whistle and cut off steam to the engine-cylinders to stop the train. The signal $g^2$, moving with said shafts is withdrawn from the screen $J^4$ and shows "danger." The described positions of said parts are plainly illustrated in Figs. 12 and 13. The brush K is in circuit with magnets J by way of wire 15, and 16 is a wire to train-battery $K^2$, having a ground, 17, through the engine-frame.

K′ represents the rear car-brush supported on an insulated bracket, as shown, or otherwise disposed, and has a ground, 26, through the car-frame. Said brush contacts with the plates $A^2$, to ground the line-battery D′ through the magnets B. It will be noted, therefore, from the foregoing, first, that the engine or train is provided with an open-battery circuit, one end of which is grounded and having in its circuit a low-resistance magnet, the armature of which controls the operation of mechanism for stopping the train or engine; second, that the latter is also provided with a rear or separate partial circuit; third, that the station appurtenances have partial circuits in which are magnets of high and low resistances, whose armature operates a step-by-step movement for breaking the circuit of the low-resistance magnet, while the circuit of the high-resistance magnet is never broken; fourth, that said station appurtenances have also a line-battery circuit, which is open and in which is located a magnet whose armature operates step-by-step mechanism to restore the broken circuit of the low-resistance magnet; fifth, that when the engine or front train brush contacts with plates A′ the open-battery circuit is closed through the partial circuits of either the high or low resistance magnets of the station appurtenances; sixth, that when the train-battery circuit is closed through the said low-resistance magnets, then the latter and the train or engine magnets J are simultaneously energized; seventh, that when the train-battery circuit is closed through said high-resistance magnets, then the latter only are energized, and the engine or train magnets are passive; eighth, that when the partial circuit of the low-resistance magnets at each station is complete, or the finger $c^3$ contacts with the plate $d^3$, then the boxes A at such stations are unlocked, indicating "clear" block ahead; and, ninth, when such circuit is not complete, then said boxes are locked, indicating an occupied or "danger" block ahead; hence, when an engine or train equipped with the above-described appliances arrives at a station whose box A is unlocked, and which, for the sake of clearness of description, I will call "station No. 1," the front or engine brush, K, contacts with the plate A′, and the engine-battery $K^2$ is thereby grounded or closed through low-resistance magnets $B^2$ of said station. Said magnets and the engine-magnets J simultaneously attract their armatures, and the catch $g^4$ of armature J′ engages with the signal $g^2$, to prevent the shaft G being rotated by the bar H′ as it is moved by the impingement of its plate or roller $H^2$ against plate A′ during the contact of the brush K therewith, as shown in Fig. 12. Consequently the train passes such station without being stopped. When the brush K leaves the plate A′, the magnets $B^2$ are de-energized, armature $b^2$ is retracted and its pawl $b^7$ steps the ratchet-wheel $d$ and shaft E, to move plate $d^3$ away from or out of contact with finger $c^3$, thereby breaking the partial circuit of the low-resistance magnets $B^2$ and locking the box A at station No. 1 for a following train. When said first-named train or leader arrives at the next station, or station No. 2, it operates, as above described, to lock the box at such station, but when its rear car-brush, K′, contacts with the plate $A^2$ thereat, the line-battery D′ is thereby closed through the magnets B of station No. 1, as represented by dotted lines $z z$, Fig. 8. Said magnets B are then energized and armature $b$ attracted. When contact between said brush K′ and plate $A^2$ is broken, said armature is retracted and its pawl $b^6$ steps the ratchet-wheel $c$ and shaft C to move the finger $c^3$ into contact with the plate $d^3$ to restore the partial circuit of magnets $B^2$ and unlock box A at said station No. 1. As said leader continues its travel and passes the successive stations, it operates the appurtenances at each station to lock the box thereat and unlock the box at a distant or a station previously passed. If, however, said leader, after locking box at station No. 1, fails to reach the next station before a following train arrives at station No. 1, then the brush K of the following train, when contacting with the plate A', does not close the battery-circuit of the train through magnets $B^2$, as its circuit is broken by the locking of box A by the leader, but closes said battery-circuit through the magnets B', and as they are of higher resistance than the train-magnets J, said magnets B' will alone be energized. Consequently the armature J' of magnets J is not attracted and the signal $g^2$ is not therefore locked in a fixed position; hence, as the bar H' is depressed, as before set forth, it rotates shaft G to show "danger" for signal $g^2$ and moves crank $g'$ to operate levers G' $G^2$ to sound the whistle and stop the engine. The described rotation or movement of shaft G is plainly illustrated in Fig. 13. As said train is being stopped, its brush K moves off of plate A', whereupon the armature $b^2$ is retracted and the pawl $b^7$ again operates ratchet $d$ and shaft D to move plate $d^3$ farther or two steps away from finger $c^3$, as shown in Fig. 8, wherein $a$ and $a'$ represent the brushes K K of the leader and following train which have passed station No. 1, and effected the above-described movements, and $a^2$ the brush K of a second following train just arriving at such station. In said figure, as well as in Fig. 9, the armatures of the station-magnets are broken away in order to more clearly show the connections and circuits. It will be noted, therefore, that though said following train is stopped as described, yet it operated the station appurtenances to move the finger $c^3$ and plate $d^3$ farther apart, or doubly lock the box A, and the second following train will act in like manner to still further lock said box, and so on. When the following trains are stopped at the stations, they may wait thereat until a signal attached to box A, as indicated by dotted lines $A^{10}$, Fig. 1, and operated by armature $b$, indicates that said box is unlocked or that the leader has passed onto the next block ahead. As said leader and the following trains arrive at station No. 2 or the next one ahead, they each ground the line-battery D' to cause the armature $b$ of magnets B at station No. 1 to restore, as above described, the contact between finger $c^3$ and plate $d^3$, and complete the circuit of magnets $B^2$ to place box A in an unlocked position. If desired, the signal $g^2$, as it is moved from beneath the screen $J^4$, may be caused to strike a bell, $G^3$, in which case, if said bell is constructed as shown, the signal $g^2$ is provided with a pivoted latch-head, $g^4$, having a spring or other device for maintaining it in position, or said bell may be otherwise arranged to permit of the use of a fixed latch-head, $g^4$, for said signal.

I do not wish to be considered as confining my invention to the arrangement and construction shown and described for the station appurtenances and train appliances, as their respective component parts may be variously arranged and differently constructed without departing from the spirit of my invention.

If desired, the engine-battery may be dispensed with, in which case wire 16 of magnets J is grounded through the engine-frame and the ground-wires 10 and 14 of magnets B' and $B^2$, respectively, are in circuit with the line-battery circuit 4, so that when the engine-brush K contacts with plate A' the battery D' is closed through either magnets B' or $B^2$ and through magnets J to its said ground 16. Such modification is diagrammatically illustrated in Fig. 20; or the battery D' may be dispensed with, in which case the wire 3 of magnets B is grounded, and the rear car-brush, K', is then dispensed with, and the engine-brush K is then caused to contact with the plates $A^2$ as well as the plates A', so that when such contact is made the magnets B are energized by the train-battery. The last-described modification is illustrated by diagram marked Fig. 21 of drawings.

In Fig. 9 I have illustrated my invention applied to a single-track railway, wherein two sets of contact-plates are employed at each station, the additional contact-plates, $A^3 A^4$, being located upon the opposite side of the track, the latter being the rear car-brush contact-plates and the former the engine-brush contact-plates. The plate $A^4$ at each station is in electrical communication with the circuit of magnets B' at such stations, the plate $A^3$ thereat having a wire or conductor, 18, which leads to plate $A^2$ of the next station, so that a train moving in the direction indicated by arrow $x'$ arriving at station No. 2 unlocks the box at said stations and locks the box at station No. 1, while a train moving in the direction indicated by arrow $x^2$ will lock and unlock said boxes, as hereinbefore described.

In Figs. 10 and 11 I have shown electro-magnetic devices to be used in connection with my invention for preventing collisions of trains at crossing-lines of railways, one of which is not equipped with my improvements. If desired, said devices may be applied to two crossing-lines of railways, neither of which is equipped with my improvements; but I do not herein claim said devices so applied, as I reserve the same for the subject of a future application. Fig. 10 illustrates the same for a single-track crossing, and Fig. 11 a double-track crossing. N N represent the tracks or railway having my improved station appurtenances, and N' N' the tracks of a railway not so equipped. The former are provided with contact-plates $N^2$, located at a suitable distance from the crossing, as shown. The engine-brush K contacts with said plates, from which proceed wires $n$ $n$, leading to a post, $n'$, designed to be grounded through the armature $o$ of magnets O. The latter is in the closed circuit of a local battery, $D^2$, so that it normally attracts its armature and provides a ground for the plates $N^2 N^2$; but when said armature is unattracted said ground is broken. At the crossing and for a distance on each side thereof the rails of the tracks $N' N'$ are electrically connected together, as illustrated, and are in circuit with magnets O by means of wires or conductors $o' o'$. The operation is as follows: If a train upon the tracks N N approach the crossing while a train on the tracks $N' N'$ is passing over the same, the wheels of the last-named train bridging the electrically-connected rails of tracks $N' N'$, as represented at $N^3$, short circuit the circuit of battery $D^2$, and cut out the magnets O therefrom and break the ground for plates $N^2$. Consequently, when the engine-brush of a train contacts therewith, the train-battery is not grounded, whereupon the engine appliances operate, as hereinbefore described, to automatically stop the train. If, however, there is no train on the tracks $N' N'$ at the crossing, then the magnet O remains in the circuit of battery $D^2$, the armature $o$ is attracted, and ground for plates $N^2$ is maintained, so that the ground for said train-battery is obtained as the engine-brush contacts with said plates, and the train passes on without being stopped.

In Fig. 15 I have shown a modification of station appurtenances wherein a single shaft, P, is substituted for the two shafts C and D, hereinbefore described. Shaft P carries a ratchet-wheel, $p$, and the insulated conducting-plate $d^3$, which normally contacts with the finger $c^3$, fixed to bracket $p'$ but insulated therefrom. Around said shaft is a spiral spring, $p^2$, so connected to wheel $p$ and the bracket $p'$ that when wound up it rotates said wheel and shaft P when they are free to move. $B' B^2$ are the high and low resistance magnets, having armature $b^2$ with retracting-spring $b^5$, and escapement $p^3$. Said armature is mounted on arbor $b^3$. The escapement $p^3$ engages with the ratchet-wheel $p$, so that whenever the armature $b^2$ is vibrated the ratchet $p$ and shaft P are stopped by the unwinding or reaction of spring $p^2$ to move plate $d^3$ out of contact with finger $c^3$. The magnets B have armature $b$ with retracting-spring $b^4$ and pawl $b^6$ engaging with ratchet-wheel $p$, and operating to wind spring $p^2$. The contact-plates $A' A^2$ are in circuit with said parts, as follows: From plate $A'$ proceeds the wire 2, having branches 8 and 9, as before described, the branch 9 passing to the high-resistance magnets $B'$, and the branch 8 passing by way of fingers $c^3$ and plate $d^3$ to low-resistance magnets $B^2$. The plate $A^2$ is in circuit with the magnets B and line-battery $D'$, as shown and before described. The contact of engine-brush K with plates $A'$ closes the train-battery through either of magnets $B'$ or $B^2$, to vibrate escapement-armature $b^2$ and permit spring $p^2$ to act to move wheel $p$ and shaft P, to step plate $d^3$ away from finger $c^3$ and break partial circuit for magnet $B^2$, and thereby lock and further lock the boxes A for following trains, while the contact of rear car-brush, $K'$, with plates $A^2$ effects a vibration of armature $b$ of magnets B, to rotate ratchet-wheel $p$ in a reverse direction to step the plate $d^3$ back into contact with finger $c^3$, to restore the partial circuit of magnets $B^2$ and unlock boxes A. The reverse movement of wheel $p$ not only restores the circuit of magnets $B^2$, but also winds the spring $p^2$.

In Fig. 16 I have shown a further modification of said appurtenances, wherein the plate $d^3$ is secured to a wheel, R, mounted upon a shaft having suitable bearings, and provided with a weight or motor, S, which acts to revolve said wheel in the direction of arrow $x^4$. The said plate $d^3$ is insulated from said wheel, as shown, and normally contacts with finger $c^3$, secured in a fixed position. From plate $d^3$ proceeds a ground, 20, and 21 is a wire connecting finger $c^3$ with the plate $A'$. Upon the wheel R are series of teeth or pins $r r'$, as more plainly shown in Fig. 18. T is a magnet in circuit with the rear car-brush contact-plates $A^2$ by way of wire 22, and has a ground, 23, in which is located a local or line battery, as shown. $t$ is an armature for magnet T, having escapement $t'$, as more plainly indicated in Fig. 17, and a retracting-spring, $t^2$, said escapement engaging with the pins $r'$ of wheel R. U is a push-rod having reacting spring $u$, spring-pawl $u'$, and bearings $u^2$. Said pawl engages with the pins $r$ of wheel R, when the rod U is depressed, by means of a pusher or bar V, attached to the engine, as shown. The remaining train appliances may be constructed and arranged as already described, or other suitable appliances for the purpose may be used in connection with this modified station appurtenance, the operation whereof is as follows: When the plate $d^3$ is in contact with finger $c^3$, as shown at $w$, the brush K, when contacting with plate $A'$, finds a ground for the engine-battery, as said station appurtenances are then in an unlocked condition. As soon as a train passes plate $A'$ the pusher V depresses bar U, causing its pawl $u'$ to engage with one of the pins, $r$, and step said wheel in a direction contrary to that indicated by arrow $x^4$, said wheel being held in its stepped position by the engagement of the escapement with the pins $r'$. Such movement of said wheel R winds up the weight or motor S, and also breaks the contact between plate $d^3$ and finger $c^3$, as shown in the full lines, Fig. 16, to place said appurtenances in a locked position by thereby breaking the ground for plate $A'$. A following train will therefore be stopped at such station, but the pusher V of said train will operate said bar U, as above described, to step the wheel R and further lock said appurtenances. When the rear car-brush contacts with plate $A^2$, the magnet T is energized, its armature vibrated to move escapement $t'$, to permit motor S to reversely step wheel R and restore contact of finger $c^3$ and plate $d^3$ or renew the ground for plate A'.

In the last-described modification the station high and low resistance magnets are dispensed with, and in lieu thereof the rod U and pusher V are used; but in this case, as well as in all others described, each passing train operates a step-by-step mechanism to break ground at the station for placing its appurtenances in a locked position, and such ground is restored to unlock said appurtenances when the engine or train passes a distant station.

If desired, the push-rod U may be arranged as shown in Fig. 19, in order that the extent of its movement may be regulated and determined.

What I claim is—

1. The combination of railway-station appurtenances having partial electric circuits with contact-plates, step-by step mechanism, and means for operating the latter, an engine or train having appliances in gear with its cut-off or stopping mechanism, and complementary partial circuits with brushes for said plates, said parts being arranged for operation, substantially as shown and described, whereby the movements of the engine or train are automatically controlled as it passes said stations, substantially as set forth.

2. The combination of railway-station appurtenances having partial electric circuits with contact-plates, step-by-step mechanism for making and closing a break in one of said partial circuits, and an engine or train provided with complementary partial circuits and brushes, substantially as shown and described.

3. The combination of railway-station appurtenances composed of high and low resistance magnets, partial circuits with contact-plates, step-by-step mechanism, and an engine or train provided with complementary partial circuits and brushes, substantially as shown and described.

4. The combination of railway-station appurtenances composed of high and low resistance magnets having partial circuits with contact-plates, step-by-step mechanism for making and closing a break in one of said partial circuits, and train-brushes and complementary partial circuits, substantially as shown and described.

5. The combination of railway-station appurtenances comprising a low-resistance magnet with partial circuit, a high-resistance magnet with like circuit, a step-by-step mechanism for making and closing a break in the partial circuit of the low-resistance magnet, contact-plates for said partial circuits, and train-brushes and complementary circuits, substantially as shown and described.

6. The combination of railway-station appliances composed of high and low resistance magnets, partial circuits therefor, step-by-step mechanism in the partial circuit of the low-resistance magnet, an electro-magnet with partial circuit and armature in engagement with said step-by-step mechanism, contact-plates for said partial circuits, and train-brushes with complementary partial circuits, substantially as shown and described.

7. The combination, with magnets B, B', and B², having separate partial circuits and contact-plates, armatures for said magnets engaging with a step-by-step mechanism which makes and closes a break in one of said partial circuits, and train-brushes with complementary partial circuits, substantially as shown and described.

8. The combination of magnets B, B', and B², having separate partial circuits, with contact-plates, armatures for said magnets, step-by-step mechanism, and train-brushes and complementary partial circuits, substantially as shown and described.

9. The combination of magnet B, having partial electric circuit, the high and low resistance magnets B' and B², with partial circuits, contact-plates for such partial circuits, means for making and closing a break in one of said partial circuits, and train-brushes and complementary partial circuits, substantially as shown and described.

10. The combination of magnets B' and B², having a common armature and separate partial circuits, a finger, $c^3$, and plate $d^3$ in the circuit of magnets B², the magnet B, with partial circuit, and step-by-step mechanism for making and breaking contact between said finger and plate, substantially as shown and described.

11. The combination of battery D', with open circuit, magnets B, B', and B², finger $c^3$, plate $d^3$, step-by-step mechanism for moving said plate, and contact-plates A' A² in partial circuit with said magnets, substantially as shown and described.

12. The combination of line-battery D', with open circuit, magnets B in normally-open circuit, magnets B' and B², of different resistances, having partial circuits, step-by-step mechanism, and means for making and closing a break in the partial circuit of magnets B², substantially as shown and described.

13. In devices for automatically controlling the movements of railway-trains, the combination of finger $c^3$ and plate $d^3$, which, when in contact, form or make a partial electric circuit having contact-plate A', means for making and closing such contact, and train-brushes with complementary partial circuits, substantially as shown and described.

14. An engine or train provided with partial electric circuits, including a magnet and front and rear brushes, an armature for said magnet, shaft G, locking or catch mechanism between said shaft and armature, lever or push rod H', connected to arm $h$, loosely mounted upon said shaft and provided with spring H, and operating mechanism interposed between said shaft and the cut-off or stopping mechanism of said engine, substantially as shown and described.

15. An engine or train provided with partial electric circuits including an electro-magnet and front and rear contact-brushes, an armature for said magnet, a shaft, G, a lock or catch between said shaft and armature, the push-rod H', mechanism between the latter and said shaft, and connections running from the cut-off mechanism of the engine to said shaft G, substantially as shown and described.

16. An engine or train having partial circuits, including a front and rear brush and an electro-magnet with armature, a battery in one of said partial circuits, a shaft, G, push-rod H', and connections between said shaft, armature, push-rod, and cut-off or stopping mechanism for the engine, substantially as shown and described.

17. The combination, in devices for automatically controlling the movements of railway-trains, of station appurtenances having partial circuits, electro-magnets, and armatures, step-by-step mechanism, operating devices for the latter, contact-plates for said partial circuits, train-brushes, and complementary partial circuits whereby when said station appurtenances are locked by a leading train they may be further locked by following trains, substantially as set forth.

18. The combination, with a locomotive-engine, of a brush, K, in partial circuit with magnet J, armature J', signal $g^2$, locking mechanism between said armature and signal, shaft G, having arm $h$, spring H, and push-rod H', substantially as shown and described.

19. The combination, with a locomotive-engine, of a brush, K, magnet J, a partial circuit therefor, armature J', signal or bar $g^2$, a lock for the armature and signal, shaft G, having crank $g'$, with connections for the cut-off mechanism of the engine, and a push rod or bar, H', substantially as shown and described.

In testimony whereof I affix my signature in presence of two witnesses.

WILLIAM C. CRANDELL, JR.

Witnesses:
S. J. VAN STAVOREN,
CHAS. F. VAN HORN.